United States Patent [19]

Musashi et al.

[11] 3,925,275
[45] Dec. 9, 1975

[54] FLAMEPROOF POLYBUTADIENE RESIN COMPOSITION HAVING EXCELLENT ELECTRICAL PROPERTIES

[75] Inventors: Akira Musashi; Masami Yamazaki, both of Ichihara; Makoto Hiruta, Chiba, all of Japan

[73] Assignee: Nippon Soda Company, Ltd., Tokyo, Japan

[22] Filed: Jan. 22, 1974

[21] Appl. No.: 435,419

[30] Foreign Application Priority Data

Jan. 25, 1973  Japan............................ 48-10450

[52] U.S. Cl. .................... 260/17.4 CL; 260/17.4 R; 260/17.4 BB; 260/17.4 GC; 260/41.34; 260/42.37; 260/45.7 B; 260/879; 260/DIG. 24

[51] Int. Cl.².. C08K 3/20; C08K 3/36; C08L 1/02; C08L 9/00

[58] Field of Search............. 260/879, 42.47, 479 R, 260/42.34, 42.37, 17.4 BB, 17.4 CL, 17.4 GC, 17.4 R, 45.7 B, DIG. 24

[56] References Cited
UNITED STATES PATENTS

| | | | |
|---|---|---|---|
| 3,137,683 | 6/1964 | Natta et al. .................... | 260/94.2 M |
| 3,162,613 | 12/1964 | Tousignant..................... | 260/45.7 P |
| 3,277,053 | 10/1966 | Hill et al.............................. | 260/62 |
| 3,432,577 | 3/1969 | Serniuk............................ | 260/879 |
| 3,498,963 | 3/1970 | Ichikawa et al.............. | 260/94.2 M |
| 3,595,851 | 7/1971 | Boutsicaris et al. ............... | 260/94.7 |
| 3,700,748 | 10/1972 | Winkler............................. | 260/879 |
| 3,714,110 | 1/1973 | Verdol et al............... | 260/33.6 AQ |
| 3,751,523 | 8/1973 | Lachowicz......................... | 260/879 |
| 3,845,102 | 10/1974 | Higuchi et al................... | 260/479 R |

OTHER PUBLICATIONS

Alliger et al., Vulcanization of Elastomers (Reinhold) (N.Y.) (1964), pp. 290–291.

*Primary Examiner*—M. J. Welsh
*Assistant Examiner*—H. H. Fletcher
*Attorney, Agent, or Firm*—George B. Oujevolk

[57] ABSTRACT

A peroxide curable flameproof polybutadiene resin composition comprising 95% to 5% of 1,2-configuration polybutadiene, 5% to 95% of a halogen containing vinyl compound in an amount that the halogen content is 3% to 40% of the total composition and 0.1% to 10% of an organic peroxide compound, wherein said 1,2-configuration polybutadiene is a polymer with or without functional groups, having a molecular weight of 500 to 100,000, having at least one polybutadiene chain consisting of butadiene residue and not more than 50% of comonomer residue, containing about 60% to about 100% of 1,2-configuration of the total butadiene units or a polymer with or without functional groups having a molecular weight of 500 to 100,000 containing at least a polymer chain which is obtained by hydrogenizing a polybutadiene polymer, with or without functional groups, consisting of a butadiene residue and not more than 50% of comonomer residue and containing about 60% to 100% of 1,2-configuration of the total butadiene unit. The halogen containing vinyl compound has following formula (1);

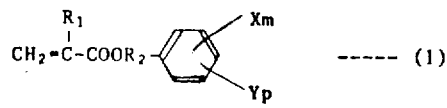

wherein ($R_1$ is a hydrogen atom, an alkyl group having 1, 2 or 3 carbon atom, $R_2$ is $(CH_2CH_2O)_n$; $n$ is 0 or an integer of from 1 to 2, X is chlorine or bromine and X can be same or different, $m$ is an integer of from 1 to 5, Y is an alkyl group having 1, 2 or 3 carbon atoms, $p$ is 0 or an integer of from 1 to 4 and $m+p$ is 5 or less than 5).

9 Claims, No Drawings

FLAMEPROOF POLYBUTADIENE RESIN COMPOSITION HAVING EXCELLENT ELECTRICAL PROPERTIES

BACKGROUND OF THE INVENTION

This invention relates to a novel curable resin composition and more particularly is concerned with a novel curable resin composition having excellent electrical properties with flameproof properties.

It is well known that a polybutadiene polymer mainly comprising the 1,2-mode of addition: the 1,2-mode of addition results in the following pendant vinyl structure

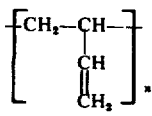

(hereinafter called "1,2-configuration polybutadiene") has excellent electrical properties.

When the resin composition as it often is used in electrical equipment is required to have flame retardance and/or be flameproof, ordinarily various kinds of flame retarder materials are added into the 1,2-configuration polybutadiene. However flame retarder materials always have a tendency to deteriorate electrical properties.

OBJECTS OF THE INVENTION

One of the objects of the present invention is to provide a resin composition having flameproof and/or self-extinguishing properties.

Another object of the invention is to provide a resin composition having excellent electrical properties such as volume resistivity, dissipation factor, dielectric constant and arc resistance.

Another object of the invention is to provide a resin composition having good mechanical strength. Other objects and advantages of this invention will further become apparent hereinafter.

SUMMARY OF THE INVENTION

We have discovered that a halogen-containing vinyl compound having the following formula (1);

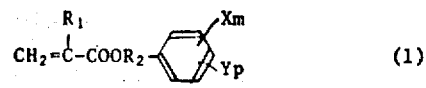

(wherein $R_1$ is a hydrogen atom, an alkyl group having 1, 2 or 3 carbon atoms or halogen atoms, $R_2$ is $-(CH_2CH_2O)_n$; $n$ is 0 or an integer of from 1 to 2, X is chlorine or bromine and X can be same or different, $m$ is an integer of from 1 to 5, Y is an alkyl group having 1, 2 or 3 carbon atoms, $p$ is 0 or an integer of from 1 to 4 and $m + p$ is 5 or less than 5) has good solubility to 1,2-configuration polybutadiene and a resin composition comprising both the 1,2-configuration polybutadiene and the halogen-containing organic compound retains its excellent electrical properties after curing by organic peroxide.

In the invention the flameproof polybutadiene resin composition consists substantially of 1,2-configuration polybutadiene, the halogen-containing vinyl compound having formula (1) in an amount that the total content of halogen contained is from 3 to 40% of total organic component of the composition and, an organic peroxide compound in an amount from 0.1 to 10% of total weight of the composition. In order to use the composition for various applications up to 70% of a vinyl monomer is preferably employed in the resin composition. Furthermore other additives such as curing promoters, silane coupling reagents, colorants, assisting agents flame resistance, polymerization inhibitors can be added to the composition if desired. A typical composition of the invention comprises 95–5%, of 1,2-configuration polybutadiene, 5–95% of halogen containing vinyl compound, 0.1–10% of organic peroxide and up to 70% of vinyl monomer. The composition can be cured at about 30°C to 200°C for 1 minute to 10 hours. When the total content of halogen in the compostion is more than 40% of organic component which is combustible, water resisting property, mechanical strength and arc resistance deteriorate extremely and when the halogen content is less than 3%, the proposed flameproof property cannot be obtained. The content of the halogen in the composition can be changed by choosing a kind of halogen containing an organic compound having formula (1) and the amount of the content can be differed in accordance with the purpose of the products.

As examples of halogen-containing vinyl compounds having formula (1) suitable compounds are listed in Table 1

Table 1

| No. | formula | | melting point or others |
|---|---|---|---|
| 1 | 2,4-dibromophenyl methacrylate | | p. 63~65°C |
| 2 | 4-methyl-2,6-dibromo phenylmethacrylate | | white crystal |
| 3 | 2,4,6-tribromophenyl methacrylate | | m.p. 77~80°C |

Table 1-continued

| No. | | formula | melting point or others |
|---|---|---|---|
| 4 | 2,4,6-tribromophenyl acrylate | 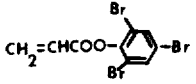 | m.p. 75~77°C |
| 5 | pentabromophenyl acrylate | 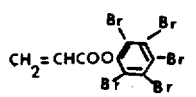 | white crystal |
| 6 | pentabromophenyl methacrylate | 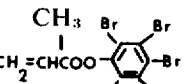 | m.p. 138~140 |
| 7 | 2,4-dichlorophenyl acrylate | 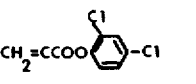 | b.p. 105°C 13 mm/Hg |
| 8 | 2,4-dichlorophenyl methacrylate | 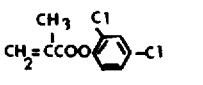 | m.p. 55~56°C |
| 9 | 2,4,6-trichlorophenyl methacrylate | 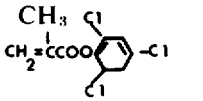 | m.p. 61~61.5°C |
| 10 | 2,4,6-trichlorophenyl methacrylate | 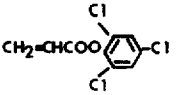 | m.p. 35~37°C |
| 11 | pentachlorophenyl methacrylate | 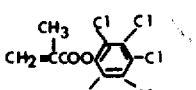 | m.p. 90~92°C |
| 12 | pentachlorophenyl acrylate | 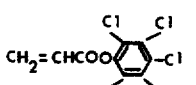 | m.p. 78~81°C |
| 13 | 2-(2,4,6-tribromophenoxy)ethylmethacrylate | 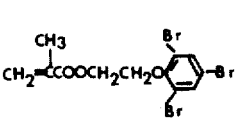 | m.p. 66~67°C |

Table 1-continued

| No. | | formula | melting point or others |
|---|---|---|---|
| 14 | 2-(2,4,6-tribromophen-oxy)ethylmethacrylate | 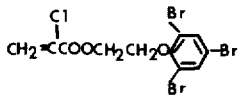 | white crystal |

In the invention, 1,2-configuration polybutadiene is defined as a polymer having a molecular weight of 500 to 100,000, having at least one polybutadiene chain consisting of a butadiene residue and not more than 50% of comonomer residue, containing 60% to 100% of 1,2-configuration of the total butadiene units and having or not having functional groups, or consisting of a polymer chain which is obtained by hydrogenizing the polybutadiene chain to the extent that at most 97% of the 1,2-configuration butadiene is hydrogenized. The 1,2-configuration polybutadiene has a hydrocarbon chain with a pendant vinyl group which makes 1,2-configuration polybutadiene a thermosetting resin. About 3% of 1,2-configuration butadiene units should be retained without being hydrogenized in order to give a thermosetting property. As typical examples of 1,2-configuration polybutadiene, butadiene homopolymer, polybutadiene glycol having hydroxyl (—OH) groups on each end of polybutadiene chain, esterified polybutadiene prepared by a reaction between the polybutadiene glycol and alkyl or aromatic mono or dicarboxylic acid and an anhydride thereof, such as maleic acid, citraconic acid, phthalic acid and anhydrids of these acids, polybutadiene dicarboxylic acid having carboxyl groups on each end of the polybutadiene chain, metallo carboxylate linked polybutadiene dicarboxylic acid, polybutadiene having olefinic bond groups on each end of the polybutadiene chain combined with an isocyanate compound and hydrogenized polybutadiene glycol or dicarboxylic acid prepared by hydrogenation of said polybutadiene glycol or polybutadiene dicarboxylic acid. These 1,2-configuration polybutadienes can be prepared by a known method. For example, when polybutadiene polymerized in anionic living polymerization and having living-terminals is allowed to react with water, carbon dioxide ($CO_2$) or ethylene oxide and the corresponding polybutadiene having no functional group, polybutadiene dicarboxylic acid or polybutadiene glycol can be obtained. Hydrogenized polybutadiene glycol or dicarboxylic acid are obtained by hydrogenation of corresponding polybutadiene glycol or dicarboxylic acid in the presence of Raney nickel with hydrogen. Further, metallo carboxylate linked polybutadiene dicarboxylic acid can be prepared by a reaction between the polybutadiene dicarboxylic acid and oxides, hydroxide and acetates of Mg, Ca and Zn. Further a most preferable polybutadiene having olefinic bond groups on each end of polybutadiene chain can be obtained by reacting said polybutadiene glycol or polybutadiene dicarboxylic acid and an isocyanate compound obtained by the reaction of an organic polyisocyanate having at least two isocyanate groups and an olefinic compound selected from the group consisting of hydroxyalkyl acrylate, hydroxyalkyl methacrylate, acrylic acid and methacrylic acid, in the stoichiometrical ratio of the polyisocyanate to the olefinic compound being not less than 1.2 to 2.5, wherein the stoichiometrical ratio of said isocyanate group of said isocyanate compound to said functional groups of said polybutadiene is not less than 0.5 to 1.2.

The polybutadiene chain may contain other kinds of comonomer residues than the butadiene unit but not more than 50% of the total butadiene chain. As such comonomers, which can be used for producing a polybutadiene chain of copoly butadiene, sytrene, α-methyl styrene, isoprene, butene-1, butene-2, isobutene and vinyl toluene can be employed with butadiene as random, block or graft copolymer.

As examples of the vinyl monomers, the following are typical:

Styrene, α-methylstyrene, t-butylstyrene, chlorostyrene, vinyl toluene, propylacrylate, ethylacrylate, methylacrylate, propylmethacrylate, ethylmethacrylate, methylmethacrylate, diethylfumarate, dimethylfumarate, diethylmaleate, dimethylmaleate, diallylphthalate and they are selected depending on the usage of the proposed resin.

Examples of organic peroxide compounds, which may be employed in the invention include; diacyl peroxides, e.g. benzoyl peroxide, 3,4-dichlorobenzoyl peroxide, octanoyl peroxide, lauroyl peroxide; dialkyl peroxides, e.g. ditert-butyl peroxide, dicumyl peroxide; alkyl peresters, e.g. tert-butyl perbenzoate, tert-butyl peracetate, di-tert-butyl perphthalate, 2,5-dimethyl 2,5-di(benzoyl peroxy)hexane; ketone peroxides; e.g. methyl ethyl ketone peroxide, cyclohexanone peroxide; and hydroperoxides, e.g. tert-butyl hydroperoxide, cumen hydroperoxide, α-phenyl ethyl hydroperoxide, cyclohexenyl hydroperoxide.

Curing promotors of this composition include amines, e.g. dimethylaniline, diethylaniline and metal salts between carboxylic acids e.g. octyl acid, stearic acid, oleic acid, linoleic acid, naphthenic acid and rosin acid and metals which are selected from the group consisting or chromium, iron, cobalt, nickel, manganese and lead act as a wring promotor. When amines are used as a curing promotors 0.1 to 5 parts of amines are used in the composition per 100 parts of thermosetting resin and in case of the metal salts, an amount of the salt corresponding to 0.001 to 1 parts of metal are preferably used per 100 parts of thermosetting resin.

As an assistant for flame resistance, ordinary antimony oxide and zinc borate may be employed to economize the amount of halogen containing organic compound.

Various kinds of goods can be produced by the composition of our invention. For example, as moulding composition, insulating or impregnating varnish the composition is preferably used by casting, potting, encapsulating or sheet moulding, bulk moulding in such electrical equipment or parts as condenser, coil, cable splicer, resistance, transistor, rectifier such as high-tension silicon diode or selenium rectifier motor, transformer, such as flyback transformer, generator, insulator, swichgear, breaker, socket, plug socket, such chemical apparatus as cock, valve, piping joint, pump, such structural parts of cars and bicycles as casings, distributor, caps, brake, clutch and such miscellaneous goods as pallete of container, tableware, tile, synthetic marble. Prepregs can be made by the resin of our invention and the resin can be employed in such laminates as electric parts, e.g. insulator of fiber reinforced plastic pipe, printed circuit boards, microwave oven trays, radar dome, parts for microwave apparatus, chemical apparatus, e.g. reactor vessels and other miscellaneous, e.g. corrugated fiber reinforced plastic board pallete of container, bath tubs, covers of electrolytic cells.

A typical composition for moulding or varnish comprises 95–5%, preferably 10–70% of 1,2-configuration polybutadiene, 5–95% of halogen containing vinyl compound, 0–70% of vinyl monomer, 0.1–10% of an organic peroxide compound, 0.001–1% of a curing promotor wherein the halogen content is 3–40% of the total organic component in the composition. Other kinds of thermosetting resins such as an unsaturated polyester or alkyd resin, and filler may be added unless it is contrary to the expected object.

A composition for the adhesive of the present invention comprises 95–5% of 1,2-configuration polybutadiene, 5–95% of halogen containing vinyl compound, 10–20% of a vinyl compound, 0.1–10% of an organic peroxide compound, 0.001–1% of curing promotor, an adequate quantity of a silane coupling agent, filler and solvent if necessary, and is available for bonding of wood, metals, glass, rubber and plastics. The resin used for the adhesive is prepared from polybutadiene having an average molecular weight of 1,000 to 20,000, preferable 2,000 to 10,000, and an organic peroxide compound, a curing promotor and a filler which are used in the composition and solvents are all applicable to the adhesive. Organic solvents which may be employed to the adhesive include aliphatic hydrocarbons, e.g. nathpha, kerosene and mineral spirits; aromatic hydrocarbons, e.g. benzene, toluene, xylene; alcohols, e.g. butanol, propanol and methyl isobutyl carbinol; esters, e.g. ethyl acetate and butyl acetate; ketones, e.g. methyl ethyl ketone, methyl isobutyl ketone and cyclohexanone; ethers, e.g. ethyleneglycol ethyl ether and ethyleneglycol butyl ether; and hydrocarbon halogenide, e.g. carbon tetrachloride, trichloroethylene, monochlorobenzene and tetra chloroethylene. Typical fillers are powder or particles of polyethylene, polybutadiene rubber, wooden dust, cellulose, plasticizer, talc, kaolin, asbestos, silica, glass fiber, mica, alumina, aluminum hydroxide, calcium carbonate, iron, aluminum, and copper and 50 to 700 parts of fillers are preferably used per 100 parts of the composition.

As reinforcing materials paper, cotton cloth, glass fiber, chopped glass synthetic fiber such as nylon and polypropylene, asbestos, wire or gauze of iron, aluminum and copper may be employed and 2 to 100 parts of such reinforcing materials are preferably employed for moulding or laminate products and glass fiber treated with surface treatment agents is most preferably employed for laminate products with good electrical and mechanical properties and heat resistance properties.

Antioxidants, which are preferably used with the composition, include; alkylphenols, imidazoles, quinones, allylamines and they are used in the quantity of 0.01 parts preferably 0.1 to 5 per 100 parts of the composition and as internal moulding releasing agents, 0.1 to 2 parts of stearates of aluminum, magnesium, zinc, calcium and barium and preferably employed for 100 parts of our moulding composition.

A composition for the coating material comprises 95–5% of 1,2-configuration polybutadiene, 5–95% of halogen containing vinyl compound 0.1 to 10% of radical initiator of peroxide, 0.001 to 1.0% of curing promotor, an adequate quantity of an organic solvent and other thermosetting resin and balance of a pigment, a filler and other additives if desired.

For a purpose of insulating or impregnating varnish, encapsulating or casting composition, in which addition of inorganic filler and an assistant for flame resistance is undesirable, halogen-containing organic compound having high halogen contant such as compounds number 1, 3, 4, 5 and 6 in table 1 is employed for adjusting a total halogen content to be 10 –40% in the composition. For the composition of the moulding or laminating product, in which the inorganic filler can be preferably added, various kind of halogen-containing organic compound can be freely employed and when an inorganic filler is employed, a lower total halogen content in the composition of 3–30% can be employed.

The effects of the present invention are shown in the following Examples. All quantities described in this specification and the appended claimed as "parts" or "percent" refer to "parts by weight" or "percent by weight" unless expressly stated otherwise.

The advantages of the invention and the results obtained from its examples herein described are first summarized in Table 2.

Table 2

| No. Cured resin | 1 [C - 1] | [C - 2] | 2 [C - 3] | [C - 4] | 3 [C - 5] | 4 [C - 6] |
|---|---|---|---|---|---|---|
| Flame retardant added: number of vinyl compound cited in Table-1 | 3 | 3 | 3 | 11 | 11 | 3 and 9 |
| Filler or reinforcement added | non | exist | non | non | exist | non |
| Barcol hardness | 53 | 60 | 57 | 8~12 | 30 | 51 |
| Flammability ASTM standard(a) | non-burning | non-burning | non-burning | non-burning | non-burning | non-burning |
| UL standard(b) | SE - 1 | SE - O | SE - O | SE - II | SE - O | SE - O |
| Volume resistivity($\omega$°cm) 25°C | $2.1 \times 10^{17}$ | $3.4 \times 10^{16}$ | $1.0 \times 10^{17}$ | $4.3 \times 10^{16}$ | $1.5 \times 10^{16}$ | $2.3 \times 10^{17}$ |
| after 2 hours in boiling water | $3.0 \times 10^{16}$ | $5.5 \times 10^{15}$ | $7.4 \times 10^{16}$ | $1.1 \times 10^{16}$ | $1.0 \times 10^{16}$ | $4.0 \times 10^{16}$ |
| at 40°C 95% RH for 24 hours | $2.7 \times 10^{16}$ | $4.6 \times 10^{15}$ | $9.1 \times 10^{16}$ | $8.9 \times 10^{15}$ | $9.5 \times 10^{15}$ | $3.5 \times 10^{16}$ |
| Arc resistance, sec (d) | 34 | 120 | 31 | 45 | 150 | 47 |
| Dielectric constant (e) | | | | | | |

Table 2-continued

| No. Cured resin | Examples 1 [C-1] | [C-2] | 2 [C-3] | [C-4] | 3 [C-5] | 4 [C-6] |
|---|---|---|---|---|---|---|
| 25°C 100 KHZ | 2.4 | 2.7 | 2.5 | 2.6 | 2.8 | 2.5 |
| 1 MHZ | 2.4 | 2.7 | 2.4 | 2.8 | 3.0 | 2.4 |
| 100° 100 KHZ | 2.6 | 2.8 | 2.6 | 2.9 | 3.1 | 2.6 |
| 1 MHZ | 2.5 | 3.0 | 2.6 | 2.8 | 2.9 | 2.5 |
| after 2 hours boiling 100 KHZ | 2.5 | 2.8 | 2.7 | 3.0 | 3.2 | 2.6 |
| Dissipation factor (f) (tan δ) | | | | | | |
| 25°C 100 KHZ | 0.005 | 0.005 | 0.005 | 0.007 | 0.008 | 0.007 |
| 100°C 100 KHZ | 0.008 | 0.007 | 0.007 | 0.008 | 0.010 | 0.007 |
| after 2 hours boiling water 100 KHZ | 0.007 | 0.008 | 0.007 | 0.008 | 0.009 | 0.008 |
| Emigration of flame retardant to surface (g) | non | non | non | non | non | non |

| | 5 [C-7] | 6 [C-8] | 7 [C-9] | Comparative examples 1 [C'-1] 2,3-dibromopropylmethacrylate | 2 [C'-2] tri(2,3-dibromopropyl)phasphate | 3 [C'-3] non |
|---|---|---|---|---|---|---|
| | 2 | 11 | 3 | | | |
| | exist | exist | exist | non | non | non |
| | 75 | 77 | 37 | 55 | 27 | 40 |
| | non-burning | non-burning | non-burning | non-burning | non-burning | burn |
| | SE-O | SE-1 | SE-1 | SE-1 | SE-II | burn |
| | $6.0 \times 10^{15}$ | $8.5 \times 10^{15}$ | $5.3 \times 10^{16}$ | $7.9 \times 10^{15}$ | $5.1 \times 10^{15}$ | $7.0 \times 10^{17}$ |
| | $3.1 \times 10^{15}$ | $3.5 \times 10^{15}$ | $2.1 \times 10^{15}$ | $2.2 \times 10^{15}$ | $7.7 \times 10^{14}$ | $3.5 \times 10^{16}$ |
| | $8.7 \times 10^{14}$ | $4.1 \times 10^{15}$ | $7.3 \times 10^{15}$ | $8.3 \times 10^{14}$ | $3.5 \times 10^{14}$ | $4.0 \times 10^{16}$ |
| | 220 | 45 | 165 | 9 | 7 | 120 |
| | 3.5 | 3.3 | 3.0 | 2.9 | 3.2 | 2.5 |
| | 3.4 | 3.5 | 2.8 | 3.3 | 3.6 | 2.4 |
| | 3.6 | 3.4 | 3.1 | 3.1 | 3.7 | 2.6 |
| | 3.7 | 3.7 | 2.9 | 3.4 | 3.9 | 2.6 |
| | 3.6 | 3.7 | 3.2 | 3.2 | 4.5 | 2.6 |
| | 0.004 | 0.006 | 0.008 | 0.009 | 0.013 | 0.004 |
| | 0.006 | 0.009 | 0.010 | 0.020 | 0.035 | 0.006 |
| | 0.007 | 0.008 | 0.009 | 0.035 | 0.041 | 0.007 |
| | non | non | non | non | extremely much | — |

NOTES
(a) ASTM-D635
(b) UL Flammability Test (Subject No. 20 & 492)
(c) ASTM-D257
(d) JISK-6911 (Japanese industrial standard chemical field)
(e) · (f) ASTM-D150
(g) Block of air oven at 50°C for 10 hours, 5 × 5 × 3 mm is used

EXAMPLE 1

Butadiene was added into tetrahydrofuran containing dispersed metallic sodium and 1,2-diphenyl benzene at −70°C, and polymerized under vigorous agitation. Water was added to the reaction mixture and 1,2-configuration polybutadiene [A-1] was obtained.

1,2-configuration polybutadiene [A-1] had following properties;

| | |
|---|---|
| number average molecular weight | 3,310 |
| 1,2-configuration | 92.5% |
| 1,4-trans configuration | 7.5% |
| viscosity of 30,400 centipoise at | 45°C |

A composition [B-1] was prepared by mixing following components.

| | Parts |
|---|---|
| 1,2-configuration polybutadiene [A-1] | 60 |
| 2,4,6-trybromophenylmethacrylate | 40 |
| styrene | 30 |
| n-butylmethacrylate | 10 |
| ter-butylperoxybenzoate | 1.5 |

The 0.01 part of 6% cobaltnaphthenate was added to the composition [B-1] and the composition was heated for 2 hours at 60°C and flameproof polybutadiene resin [C-1] containing 17% of bromine was obtained.

On the other hand, 100 parts of silica powder (95% of the powder pass 200 mesh) and 2 parts of vinyl silane (γ-methacryloxypropyltrimethoxysilane) were mixed to the composition [B-1] and after degassing under reduced pressure, the composition was heated and cured at 30°C for 2 hours and flameproof polybutadiene resin [C-2] was obtained.

EXAMPLE 2

1,2-configuration polybutadiene [A-2] was obtained according to a method shown in Example 1.

1,2-configuration polybutadiene [A-2] had following properties;

| | |
|---|---|
| number average molecular weight | 3,303 |
| 1,2-configuration | 92.6% |
| 1,4-transconfiguration | 7.4% |
| viscosity of 25,500 centipoise at | 45°C |

On the other hand, butadiene was added into tetrahydrofuran containing a dispersed metallic sodium and 1,2-diphenyl benzene at −75°C, and polymerized under vigorous agitation. The reaction mixture was treated with ethylene oxide and water, and 1,2-configuration polybutadiene [A-3] of polybutadiene glycol was obtained and it has following properties;

1,2-configuration polybutadiene [A-3] of polybutadiene glycol;

| | |
|---|---|
| number average molecular weight | 1,830 |
| 1,2-configuration | 92.1% |
| 1,4-trans configuration | 7.9% |
| viscosity of 10,900 centipoise at | 45°C |
| hydroxyl value | 49.5 |

Further, 1,2-configuration polybutadiene [A-3] of polybutadiene glycol was reacted at 80°C for 4 hours with a reaction product between 1 mole of toluylenediisocyanate and 1 mole of 2-hydroxyethylenethacrylate at 50°C for 3 hours and 1,2-configuration polybutadiene [A-4] having olefinic double bonds on the ends of polymer chain. The polybutadiene [A-4] had following structure;

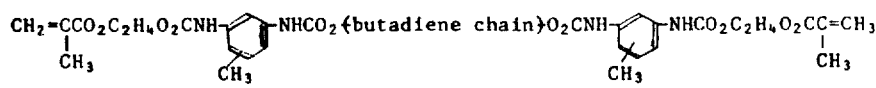

a composition [B-2] was prepared by mixing following components.

| | Parts |
|---|---|
| 1,2-configuration polybutadiene [A-2] | 30 |
| 1,2-configuration polybutadiene [A-4] | 30 |
| tribromophenylmethacrylate | 50 |
| mono-chlorostyrene | 90 |
| 1,1-bis(ter-butylperoxyketal)-3,3,5-trimethylcyclohexane | 1 |

Then 0.04 part of 6% cobalt octenate was added to the composition [B-2] and the composition was heated and cured for 1.5 hours at 80°C or for 1 hour at 100°C and flameproof polybutadiene resin [C-3] was obtained.

EXAMPLE 3

1,2-configuration polybutadiene [A-4] was obtained according to a method shown in Example 2.

1,2-configuration polybutadiene [A-4] of polybutadiene glycol had following properties;

| | |
|---|---|
| number average molecular weight | 1,350 |
| 1,2-configuration | 92.3% |
| 1,4-transconfiguration | 7.7% |
| viscosity of 8,000 centipoise at | 45°C |
| hydroxyl value (mg/KOH) | 77.3 |

Further the polybutadiene [A-4] was hydrogenized in the presence of nickel catalyst and 2,6-diter-butylhydroxytoluene at 170°C for 15 hours in a stream of hydrogen, and 1,2-configuration polybutadiene [A-5] of hydrogenized polybutadiene glycol was obtained. The polybutadiene [A-5] was reacted at 80°C for 4 hours with a reaction product between 1 mole of toluylenediisocyanate and 1 mole of 2-hydroxyethylmethacrylate at 80°C for 2 hours and 1,2-configuration polybutadiene having olefinic double bonds on the ends of polymer chain. The polybutadiene [A-6] has following structure;

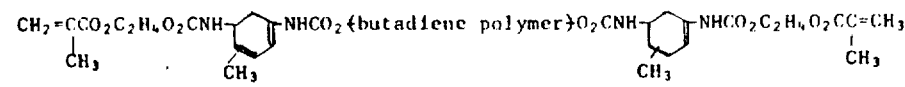

A composition [B-3] was prepared by mixing following components.

| | Parts |
|---|---|
| 1,2-configuration polybutadiene [A-6] | 60 |
| pentabromophenylmethacrylate | 30 |
| styrene | 40 |
| ter-butylperbenzoate | 2 |

Then 0.02 part of 6% cobaltnaphthenate was added to the composition and the composition was heated and cured for 80°C for 1 hour and flameproof polybutadiene polymer [C-4] containing 16.5% of bromine was obtained.

Further a composition [B-4] was prepared by mixing 100 parts of the composition [B-3] with 1 part of vinylsilane (γ-methacryloxypropyltrimethoxy 50 parts of silica powder (95% of powder particles pass 200 mesh) 40 parts of aluminum hydroxide and 10 parts of antimony trioxide and after degassed, the composition [B-4] was heated and cured for 2 hours at 70°C and flameproof polybutadiene resin [C-4] was obtained.

EXAMPLE 4

Styrene and butadiene were added into tetrahydrofuran containing dispassed metallic sodium and naphthalene at −75°C and polymerization took place under vigorous agitation. The reaction mixture was added water and 1,2-configuration polybutadiene [A-7] having butadiene-styrene copolymer chain were obtained.

1,2-configuration polybutadiene [A-7] had following properties;

| | |
|---|---|
| number average molecular weight | 4,931 |
| butadiene unit in the chain | 79.4% |
| styrene unit in the chain | 20.6% |
| 1,2-configuration | 67.3% |
| 1,4-trans configuration | 7.5% |
| 1,4-cis configuration | 9.9% |

A composition [B-5] was prepared by mixing the following components.

| | Parts |
|---|---|
| 1,2-configuration polybutadiene [A-7] | 60 |
| 2,4,6-trichlorophenylmethacrylate | 30 |
| 2,4,6-tribromophenylmethacrylate | 30 |
| vinyl toluene | 10 |
| ethylene glycol dimethacrylate | 10 |
| di-ter-butylperoxide | 1 |
| ter-butylperoxybenzoilperoxide | 1 |

Further the composition [B-5] was heated and cured for 2 hours at 100°C and flameproof polybutadiene resin [C-5] containing 11.2% by weight of bromine and 7.5% by weight of chlorine was obtained.

EXAMPLE 5.

A composition [B-6] was prepared by mixing following compositions.

| | Parts |
|---|---|
| 1,2-configuration polybutadiene [A-4] shown in example 2 | 500 |
| 4-methyl-2,6-dibromophenylmethacrylate | 100 |
| dicumyl peroxide | 15 |
| silica powder (95% of powder particle pass mesh 300) | 1000 |
| clay powder | 500 |
| calcium hydroxide | 250 |
| vinylsilane (vinyltrimethoxysilane) | 15 |
| calcium stearate | 10 |

The composition [B-6] was mixed well with 100 parts of glass fibre having length of about 13 mm and the mixture was moulded under pressure of 15 kg/cm² at 160°C for 1 minute/1 mm according to the thickness and moulding product [C-6] was obtained.

EXAMPLE 6

A composition [B-7] was prepared by mixing following composition.

| | Parts |
|---|---|
| 1,2-configuration polybutadiene [A-1] | 300 |
| pentachlorophenylmethacrylate | 150 |
| benzoate peroxide (50% dioctylphthalate solution) | 4 |
| dicumyl peroxide (50% dioctylphthalate solution) | 9 |
| toluene | 300 |

The composition [B-7] was impregnated into glass fibre cloth of 30 cm wide and 30 cm length and 12 seets of the impregnated glass fibre cloth (prepreg) were heated and cured together under a pressure of 10 kg/cm² at 150°C for 10 minutes and flameproof laminate [C-7] containing 18.4% by weight of chlorine was obtained.

EXAMPLE 7

200 parts of 1,2-configuration polybutadiene [A-2] shown in example 2, 20 parts of Raney Nickel and 150 parts of dioxane were fed in antoclave having a capacity of 2 litres and the mixture was hydrogenized at 80°C under hydrogen gas pressure of 70 kg/cm². Hydrogenized polybutadiene obtained had an iodine number of 53. 200 parts of the polybutadiene and 4.66 parts of maleic anhydride were fed in a reactor having a condenser and a nitiogen gas inlet pipe and a thermometer and esterification was carried out at 130°C for 3 hours and then under a reduced pressure of about 100 mmHg at 120°C for 4 hours the esterification was completed and obtained 1,2-configuration polybutadiene [A-8] having unsaturated polyester chain was obtained.

A composition [B-8] was prepared by mixing following compositions.

| | Parts |
|---|---|
| 1,2-configuration polybutadiene [B-8] | 50 |
| 2,4,6-tribromophenylmethacrylate | 40 |
| styrene | 50 |

The composition [B-8] containing 17% by weight of bromine was mixed further with 100 parts of silica powder, 30 parts of aluminum hydroxide, 2 parts of vinyltrimetho-ysilane, 1 part of methylethylketoneperoxide, 1 part of ter-butylperoxybenzoate and the mixture was further added 0.05 part of 6% cobalt naphthanate, after degassing, the mixture was heated and cured at 40°C for 1 hour, and cured resin [C-8] was obtained.

What is claimed is:

1. A peroxide curable flameproof butadiene polymer resin composition comprising:
   a. 95% to 5% of 1,2-configuration butadiene polymer;
   b. 5% to 95% of a halogen containing vinyl compound in such an amount that the halogen content is 3% to 40% of the total composition; and,
   c. 0.1% to 10% of an organic peroxide compound, wherein
   d. said 1,2-configuration butadiene polymer is a polymer having a molecular weight of 500 to 100,000 having at least one butadiene polymer chain consisting of a butadiene residue and at most 50% of comonomer residue, containing about 60% to about 100% of 1,2-configuration of the total butadiene units or
   e. a polymer having molecular weight of 500 to 100,000 containing at least a polymer chain which is obtained by hydrogenizing a butadiene polymer having at least one butadiene polymer chain consisting of a butadiene residue and at most 50% of comonomer residue and containing about 6% to 100% of 1,2-configuration of the total butadiene unit; and further:
   f. said halogen containing vinyl compound is a compound having the following formula:

$$CH_2=\overset{R_1}{\underset{|}{C}}-COOR_2 - \underset{Y_p}{\overset{X_m}{\bigcirc}}$$

(wherein $R_1$ is a hydrogen atom or alkyl group having 1, 2 or 3 carbon atoms; $R_2$ is $(-CH_2CH_2O)_n$; $n$ is 0 or an integer of from 1 to 2, X is chlorine or bromine and X can be the same of different, $m$ is an integer of from 1 to 5, Y is an alkyl group having 1, 2 or 3 carbon atoms, $p$ is 0 or an integer of from 1 to 4 and $m+p$ is 5 or less than 5).

2. A peroxide curable flameproof butadiene polymer resin composition according to claim 1, wherein there is added up to 70% of vinyl monomer and 0.001% to 10% of a curing promotor to said resin.

3. A peroxide curable flameproof butadiene polymer resin composition according to claim 2, wherein there is added an amount of 50 part to 700 parts of filler per 100 parts of the composition to said resin.

4. A peroxide curable flameproof butadiene polymer resin composition according to claim 2, wherein the halogen containing vinyl compound is 2,4,6-tribromophenylacrylate or 2,4,6-tribromophenylmethacrylate.

5. A peroxide curable curable flameproof butadiene polymer resin composition according to claim 2 wherein the 1,2-configuration butadiene polymer has a functional group of hydroxyl group (—OH) or carboxyl group (—COOH) on each end of the polymer chain, and the number average molecular weight is from 500 to 20,000.

6. A peroxide curable flameproof butadiene polymer resin composition according to claim 2, wherein the 1,2-configuration butadiene has an average molecular weight of from 500 to 20,000.

7. A peroxide curable flameproof butadiene polymer resin composition according to claim 2, wherein the 1,2-configuration butadiene polymer is an esterified butadiene polymer obtained by the reaction of alkyl or aromatic carboxylic acids or anhydrides thereof and a butadiene polymer having at least a butadiene polymer chain consisting of butadiene residue and at most 50% of comonomer residue having a hydroxyl group on each end of the polymeric chain and a number average molecular weight of from 500 to 20,000.

8. A peroxide curable flameproof butadiene polymer resin composition according to claim 2, wherein the 1,2-configuration butadiene polymer is a polymer comprising a reaction product between
  a. a butadiene polymer having a polymer chain consisting of butadiene residue and at most 50% of comonomer residue, having about 60% to about 100% of 1,2-configuration of butadiene units and having a functional group of —OH or —COOH on each end of said polymeric chain, and a number average molecular weight of from 500 to 10,000; and,
  b. an isocyanate compound obtained by the reaction of an organic polyisocyanate having at least two isocyanate groups and an olefinic compound selected from the group consisting of hydroxyalkyl acrylate, hydroxyalkyl methacrylate, acrylic acid and methacrylic acid, the stoichiometrical ratio of the polyisocyanate to the olefinic compound being not less than 1.1 to 2.5, and wherein the stoichiometrical ratio of said isocyanate compound to said functional groups of said butadiene polymer is not less than 0.5 to 1.2, whereby said peroxide-curing can be effected in a short time.

9. A peroxide curable flameproof butadiene polymer resin composition according to claim 2, wherein 1,2-configuration butadiene polymer is a polymer comprising a reaction product between
  a. hydrogenized butadiene polymer, to the extent that at most 97% of 1,2-configuration butadiene units is hydrogenized by the hydrogenation of butadiene polymer having at least one butadiene polymer chain containing butadiene residue and at most 50% of comonomer residue, having about 60% to 100% of 1,2-configuration of butadiene units, substantially a functional group of hydroxyl group (—OH) or carboxyl group (—COOH) on each end of said polymeric chain, and a number average molecular weight of from 500 to 10,000; and,
  b. an isocyanate compound obtained by the reaction of an organic polyisocyanate having at least two isocyanate groups and an olefinic compound selected from the group consisting of hydroxyalkyl acrylate, hydroxyalkyl methacrylate, acrylic acid and methacrylic acid, the stoichiometrical ratio of the polyisocyanate to the olefinic compound being not less than 1.1 to 2.5 and wherein the stoichiometrical ratio of said isocyanate compound to said functional groups of said butadiene polymer is not less than 0.5 to 1.2.

* * * * *